United States Patent [19]
Seale

[11] Patent Number: 6,106,189
[45] Date of Patent: Aug. 22, 2000

[54] CLAMPING ARRANGEMENTS

[75] Inventor: David Ian Seale, Derby, United Kingdom

[73] Assignee: Robert Janos Bokros, United Kingdom; a part interest

[21] Appl. No.: 09/043,027

[22] PCT Filed: Sep. 20, 1996

[86] PCT No.: PCT/GB96/02328

§ 371 Date: Mar. 11, 1998

§ 102(e) Date: Mar. 11, 1998

[87] PCT Pub. No.: WO97/11279

PCT Pub. Date: Mar. 27, 1997

[30] Foreign Application Priority Data

Sep. 23, 1995 [GB] United Kingdom ................... 9519933
Nov. 18, 1995 [GB] United Kingdom ................... 9523633

[51] Int. Cl.[7] ....................................................... F16B 1/00
[52] U.S. Cl. .......................... 403/398; 403/396; 403/399; 403/384; 248/74.1; 248/230.3
[58] Field of Search ..................................... 403/398, 395, 403/400, 396, 325, 384, 399; 248/74.1, 65, 230.1, 230.3

[56] References Cited

U.S. PATENT DOCUMENTS

| | | | |
|---|---|---|---|
| 1,716,904 | 6/1929 | Siderits | 403/396 |
| 1,940,704 | 12/1933 | Sumpter et al. | 403/399 X |
| 2,187,642 | 1/1940 | Brown | 403/399 |
| 2,456,054 | 12/1948 | Eberhardt | 403/396 X |
| 3,535,751 | 10/1970 | Batchelor | 403/395 |
| 4,867,596 | 9/1989 | Ocuin | |
| 5,807,017 | 9/1998 | Noble | 403/400 X |

FOREIGN PATENT DOCUMENTS 2194249 7/1972 France .
859091 7/1949 Germany .

*Primary Examiner*—John R. Cottingham
*Attorney, Agent, or Firm*—Watt, Hoffmann, Fisher & Heinke Co., L.P.A.

[57] ABSTRACT

A pipe or tube clamp is disclosed. The clamp has two U-shaped elements fixed to a plate. A screw interposed between the plate and a clamping member supplies pressure to a pair of tubes to urge them together against reaction in the U-shaped members. The tubes may be either parallel or orthogonally arranged.

29 Claims, 5 Drawing Sheets

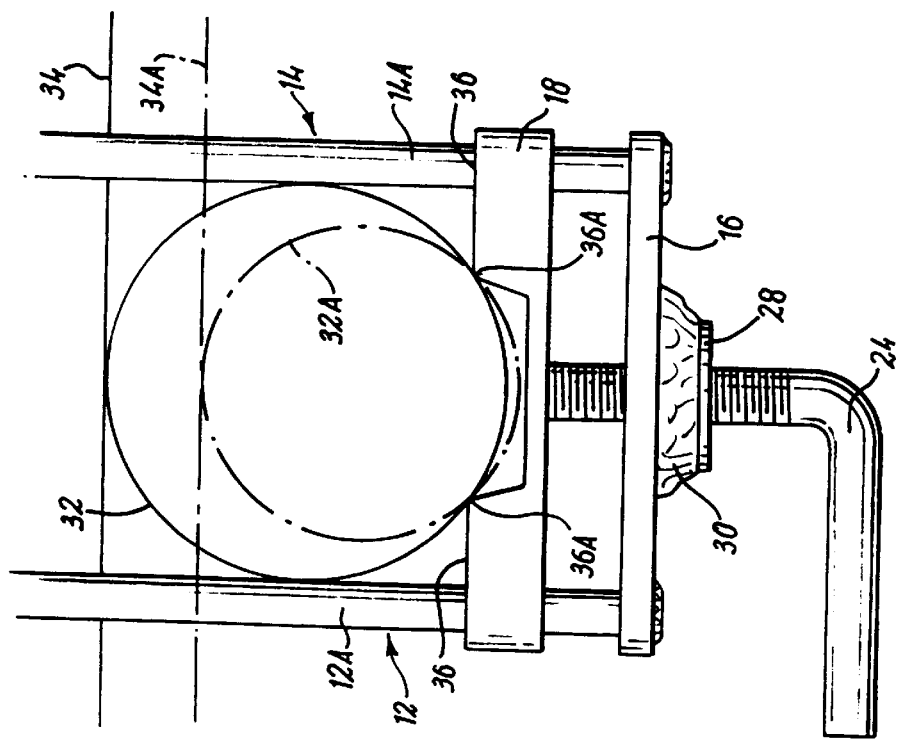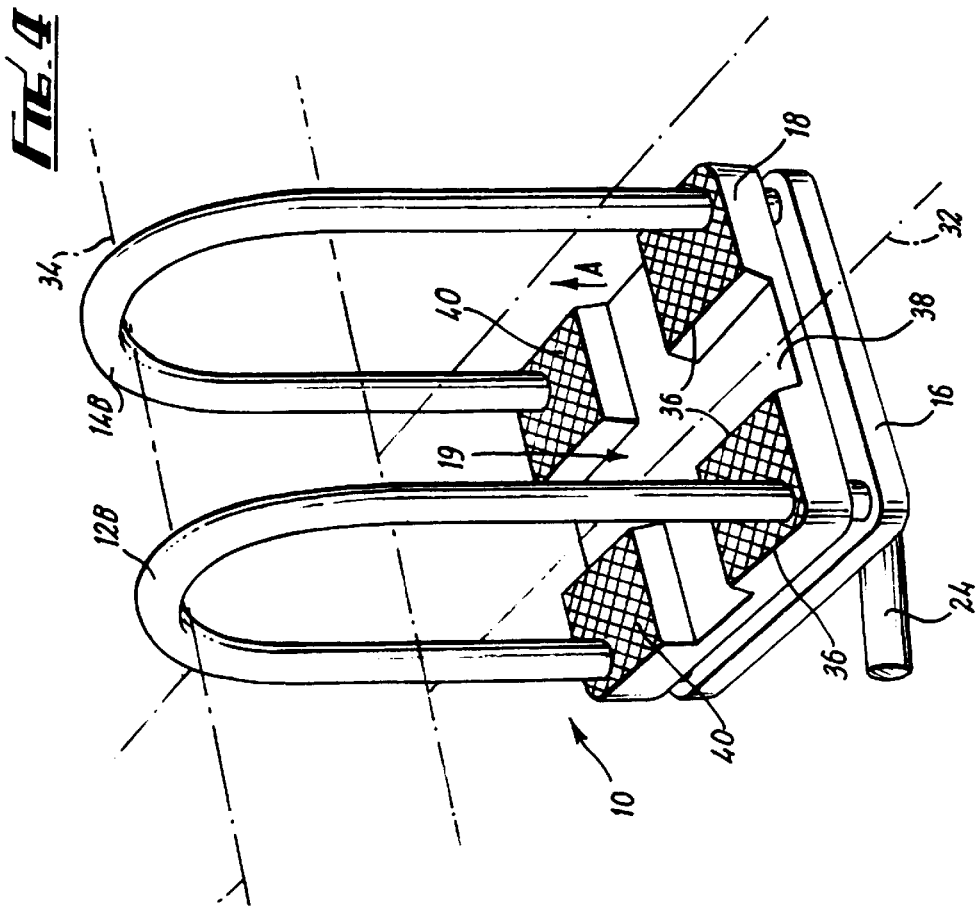

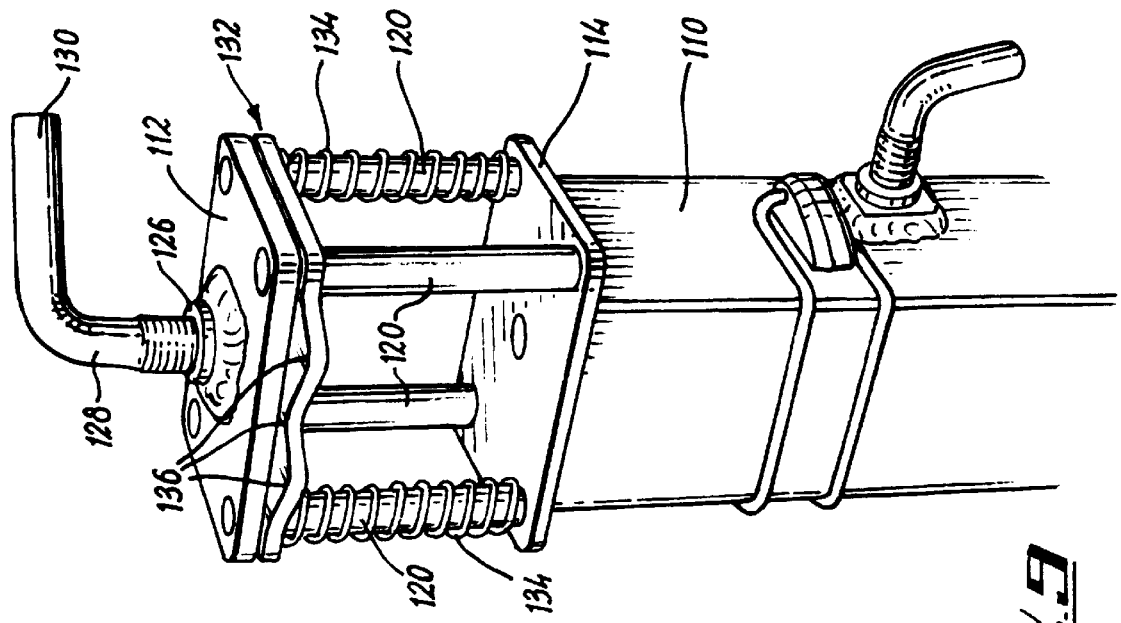
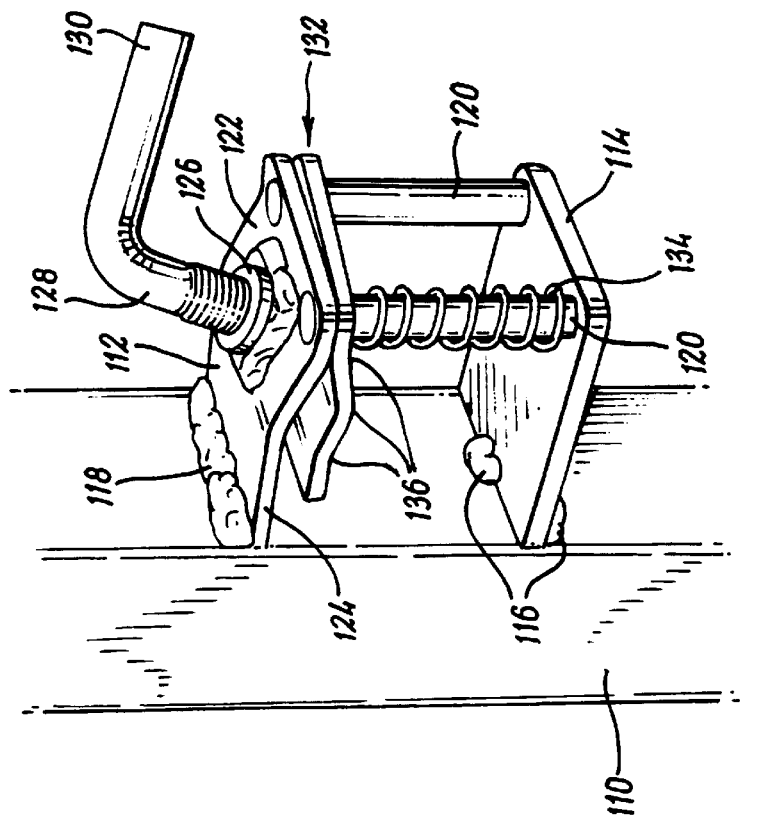

CLAMPING ARRANGEMENTS

The present invention concerns improvements in or relating to clamping arrangements, especially but not exclusively clamping arrangements for fixing one elongate member to another.

A number of ways are provided to fasten together tubing temporarily. For example the tubes can be fastened together by using rope and lashing appropriate length of the rope around the tubes. Alternatively, the tubes can be clamped together using clamps. Such clamps often have disadvantages that they can be used with only one size of tube and only in specific orientations.

According to one aspect of the invention there is provided a clamping arrangement comprising a reaction member, mounting means extending from the reaction member, a movable member mounted on and guided by the mounting means, the mounting means defining an engagement means spaced from the reaction member, and urging means operable via the reaction member to urge the movable member and the engagement means towards each other, whereby on placing an article between the movable member and the engagement means operation of the urging means causes the movable member to clamp the article between the movable member and the engagement member.

Preferably the engagement means is defined by a central region of the mounting means spaced from the reaction member. The mounting means may comprise a U-shaped member having the end regions thereof attached to the reaction member. Preferably, the mounting means comprises two of said U-shaped members arranged in alignment for an article to be received between the legs of each U-shaped member.

Preferably, the engagement means constitutes the central region of the or each U-shaped member. Each U-shaped member is conveniently in the form of a bar. The engagement means may be curved or substantially straight to correspond to the profile of the article.

The reaction member may comprise a substantially flat plate which may be of a substantially rectangular configuration, preferably substantially square. However, it will be appreciated that the flat plate can be of other suitable configuration. Where the reaction member is of a rectangular configuration, the mounting means is preferably attached thereto in the vicinity of the corners thereof.

The mounting means may be attached to the reaction member by welding or other suitable means of attachment such as by the use of an appropriate adhesive. Alternatively, the reaction member and the mounting means may be of integral construction formed together, for example by casting.

The reaction member may be so configured that the urging means extends therethrough. Preferably, the reaction member defines an aperture through which the urging means extends. The aperture may be provided with threads and the urging means may be provided with corresponding threads, whereby when the urging means is screwed into the reaction means to engage the engagement means, the engagement means is urged away from the reaction means.

The urging means is preferably in the form of a bolt which may be substantially L-shaped. It will be appreciated that the bolt can be of any other configuration or may be a bolt with a known hexagonal head, or may be an allen key bolt or other similar bolt.

The movable member preferably comprises a contact surface which is preferably appropriately configured to correspond to the configuration of the article. The contact surface preferably comprises raised regions and recesses between the raised regions to correspond to the configuration of the article. The raised regions may be substantially planar to engage a substantially planar surface on the article. The recesses may have a curved configuration to correspond to a curved surface on the article.

The movable member may define recesses or aperture s to receive the receiving means to enable the engagement member to be guided by the receiving means.

In a first embodiment of the invention, the mounting means is adapted to receive first and second articles which may be arranged substantially mutually orthogonal. Alternatively, the first and second articles may be arranged substantially parallel to each other, whereby each article extends through both U-shaped members.

In a second embodiment, the movable member is attached, for example by welding, onto an element which may be a tube of square or circular profile. In this embodiment, the element is arranged between the movable member and the reaction member. A bracing member may be provided on the element between the element and the reaction member. The bracing member is preferably in the form of a plate which is attached, preferably by welding, to the element. The bracing member may also define apertures through which the receiving means extends.

Alternatively, in the second embodiment the movable member may be in the form of lugs, each lug defining an aperture, the lugs being provided on and extending from the element, whereby the receiving means extends through the apertures in respective lugs. The bracing member in this alternative second embodiment may be in the form of lugs fixed to the element, each lug preferably defining a respective one of said apertures.

According to another aspect of the present invention there is provided a clamping arrangement comprising a reaction member, mounting means extending from said reaction member and supporting engagement means spaced from said reaction member, a movable member guided by said mounting means between said reaction member and said engagement means and urging means mounted on said reaction member to urge said movable member towards said engagement means whereby on placing an article between said engagement means and said movable member operation of the urging means causes movement of the movable member towards said engagement means to clamp said article therebetween.

The urging means may comprise a clamping bolt threadably received in said reaction member, the clamping bolt being operable by screwing said bolt into said first member.

Preferably said mounting means comprises a pair of spaced apart bars. The article to be clamped is preferably an elongate article such as a tube which may be of round or rectangular cross-section.

Preferably said third member is spring biased away from said base member. The spring biasing may be provided by a coil spring fitted around one of bars. The third member may be on the form of a plate.

In one embodiment the reaction and engagement members may be permanently fixed to a structure at their ends remote from the mounting means by, for example, welding.

Preferably the reaction member is inclined away from the engagement member over a portion extending from said mounting means and the clamping bolt is threadably mounted in said inclined portion.

In another modification the engagement member is fixed to the end of a structure and two spaced mounting means are provided. Preferably in this modification the third member is guided on both mounting means and one bar of each means has a coil spring arranged therearound to bias the movable member away from the engagement member.

Preferably the movable member is deformed out of a planar condition.

Preferably the deformations are provided by creases whereby the face of the movable member facing the second member defines a channel or partial channel for reception of the elongate article to be clamped.

An embodiment of the present invention will now be described by way of example only with reference to the accompanying drawings in which:

FIG. 4 is a view similar to FIG. 1 of an alternative clamping arrangement;

FIG. 5 is a side view of the clamping arrangement shown in FIG. 4 showing its use with different sized articles;

FIGS. 8 and 9 show perspective views of two alternative forms of clamping arrangements.

Figure 1:
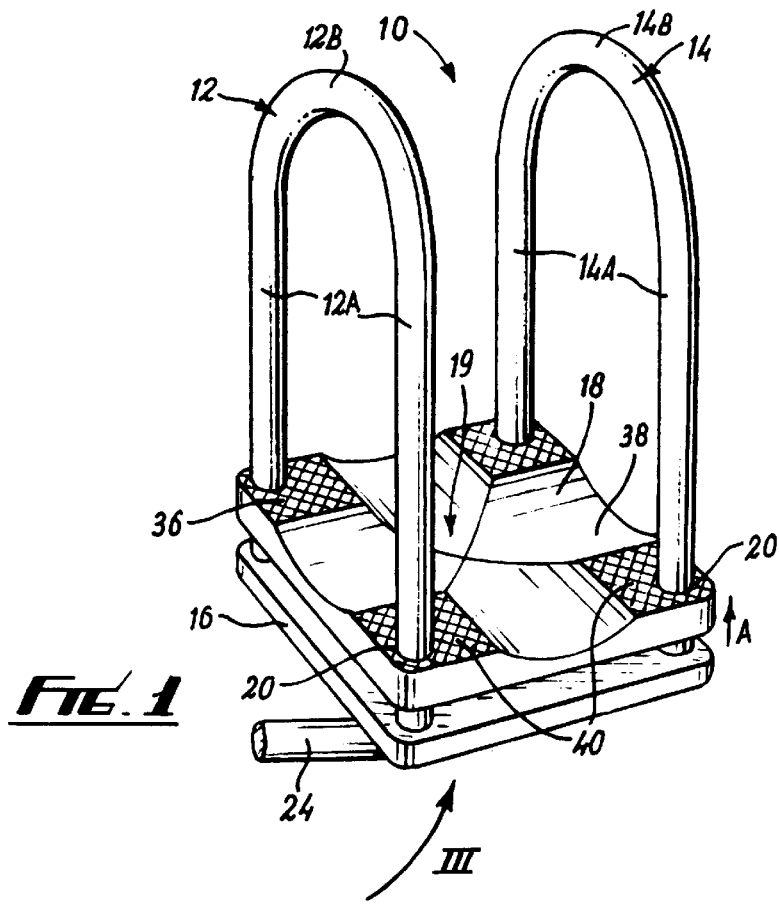
FIG. 1 is a perspective view of a first embodiment of a clamping arrangement.

Referring to FIGS. 1 to 5, there is shown a first embodiment of a clamping arrangement 10 which comprises first and second U-shaped members 12, 14 for receiving first and second articles to be clamped together. The first and second U-shaped members 12, 14 are attached at their ends to a reaction member in the form of a square plate 16. A movable member 18 is slidably movable relative to the U-shaped members 12, 14, the legs 12A, 14A extending through apertures 20 in the movable member 18. Thus, the movable member 18 can move up and down, and is guided by, the legs 12A, 14A of the U-shaped members 12, 14. The movable member 18 has a contact surface 19 to contact the first article.

Figure 3:
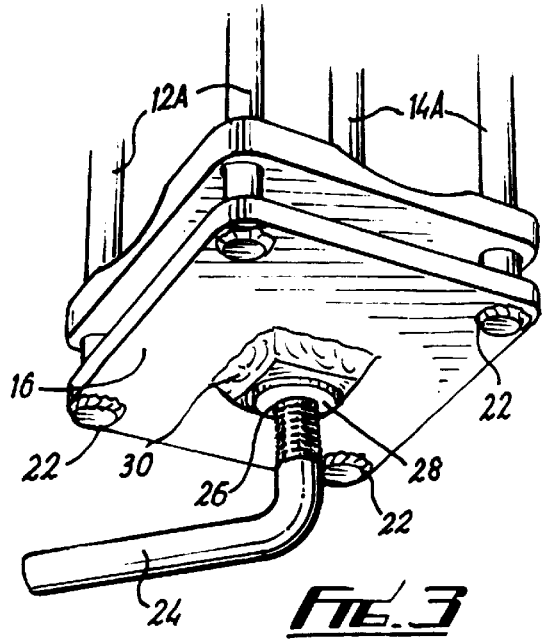
FIG. 3 is a view of the securing means of FIG. 1 in the direction indicated by arrow III.

Referring to FIG. 3, the legs 12A, 14A extend through the plate 16 to be secured thereto by welding as at 22.

As can be seen, the plate 16 and the engagement member 18 are of a substantially square configuration and correspond to each other in size.

The clamping arrangement 10 further comprises urging means in the form of a L-shaped clamping bolt 24 which extends through an aperture 26 in the plate 16. The aperture 26 has associated therewith threads corresponding to threads provided on the bolt 24 (only the threads on the bolt 24 being shown, for clarity).

The threads can be provided on either a nut 28 which is welded at 30 to the underside of the plate 16 in alignment with the aperture 26. Alternatively, the threads could be provided directly on the plate 16 at the aperture 26.

The clamping arrangement 10 is particularly suitable for fastening together articles in the form of elongate bars or tubes, which can be of a square, circular or other suitable cross-sectional profile. In this connection, reference is made to FIG. 4 which shows schematically, and in dotted lines, a first article in the form of a first tube 32 and a second article in the form of a second tube 34 being fastened together by the clamping arrangement 10.

In operation, the tubes 32, 34 are arranged in the position shown in FIG. 4. The bolt 24, is screwed into the plate 16, through the aperture 26. As can be seen from FIG. 5, the bolt 24 extends through the plate 16 to engage the movable member 18. Lightening of the bolt 24 into the plate 16 pushes movable member 18 in the direction indicated by the arrow A in FIGS. 1 and 4. Thus, the contact surface 19 contacts the first tube 32, which is pushed against the second tube 34. Further tightening of the bolt 24 results in the second tube 34 being pushed against the central regions 12B, 14B of the U-shaped members 12, 14. The plate 16 provides a reaction force to the bolt 24 to secure the first and second tubes, 32, 34 between the engagement member 18 and the receiving means 12, 14 to fasten the tubes 32, 34 together.

The clamping arrangement 10 can clamp together the tubes 32, 34 such that they are mutually orthogonal, as shown in FIG. 4. Alternatively, the tubes 32, 34 can be fastened together such that they are parallel to each other, with both tubes 32, 34 extending through the U-shaped members 12, 14.

A number of modifications can be made departing from the scope of the invention. For example, if a comparison is made between FIGS. 1 and 4, it will be seen that the engagement surface 19 of the engagement member 18 in each figure is different. The engagement surface 19 in FIG. 1 comprises raised portions 36 and recesses 38. The recesses 38 are curved and would correspond to the configuration of a first tube 32 having a curved profile. The configuration of the engagement surface 19 shown in FIG. 4 also comprises raised portions 36 and recesses 38, but the recesses 38 are not curved as shown in FIG. 1. The raised regions 36 are provided to engage a tube 32 having a substantially square profile. Each raised portion 36 is provided with striations 40 to provide improved grip on such a square profiled tube 32.

Figure 2:
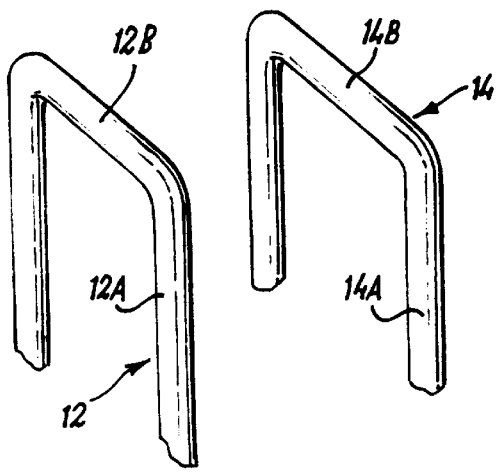
FIG. 2 shows an alternative configuration of the receiving means of a clamping arrangement shown in FIG. 1.

FIG. 2 shows a further modification in which the central regions 12B, 14B of the U-shaped members 12, 14 are substantially straight rather than curved as shown in FIG. 1. This is to provide improved fastening of the clamping arrangement 10 where the first tube 34 has a substantially square profile.

FIG. 5 shows that the fastener shown in FIG. 4 (and also that shown in FIG. 1) can be used to fasten different sized tubes. In FIG. 5, there is shown in solid lines a first tube 32 fastened to a second tube 34. It can be seen that the clamping arrangement 10 can also be used to fasten the tubes shown in the dotted lines and marked 32A, 34A. In each case, the first tube 32, 32A engages the engagement surface of the engagement member 18 at a corner 36A of each raised region 36.

In a further modification (not shown), the apertures 20 can be in the form of recesses at the corners of the engagement member 18 to receive the legs 12A, 14A of the U-shaped members 12, 14.

Figure 6:
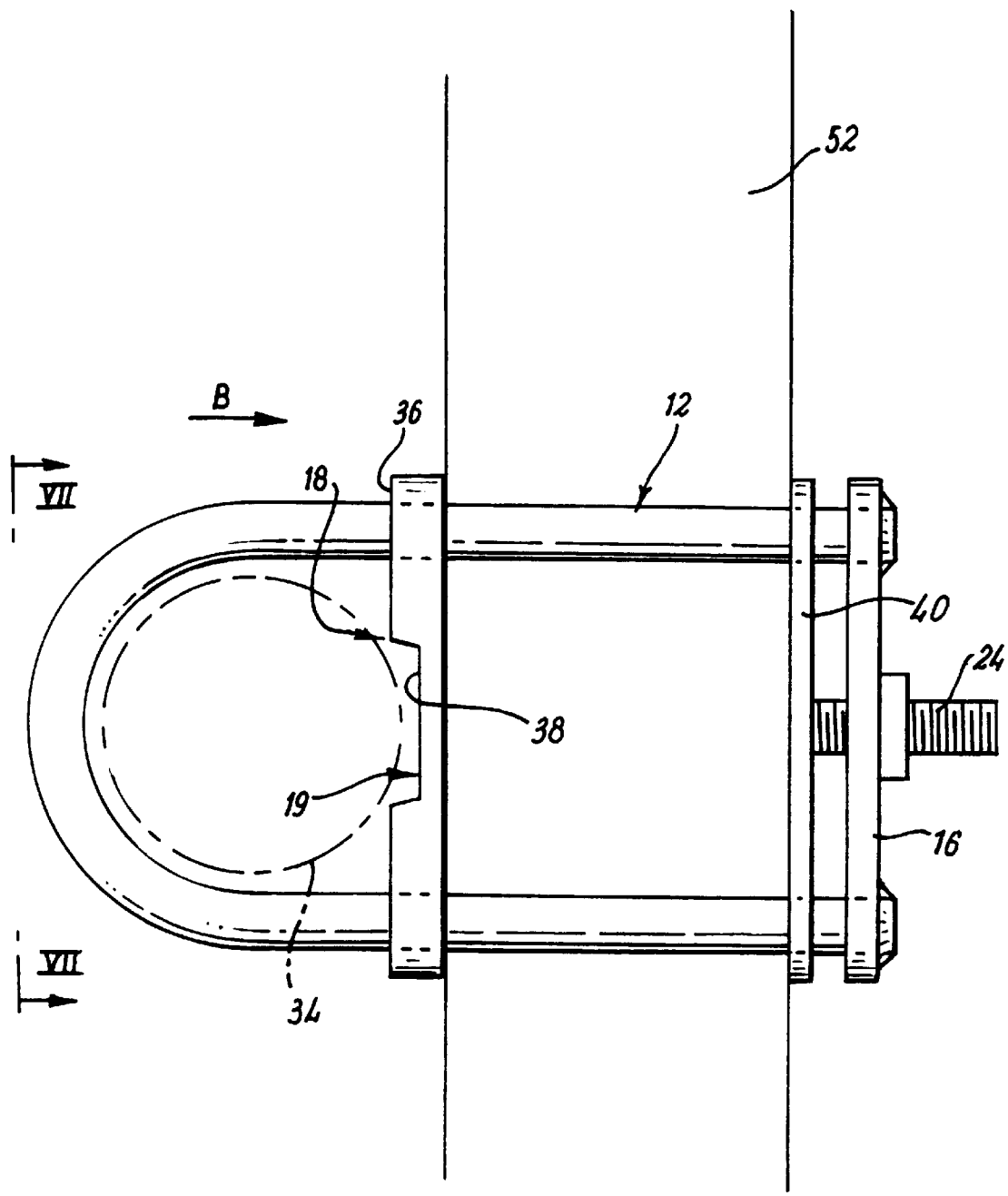
FIG. 6 is a side view of a further alternative clamping arrangement.
Figure 7:
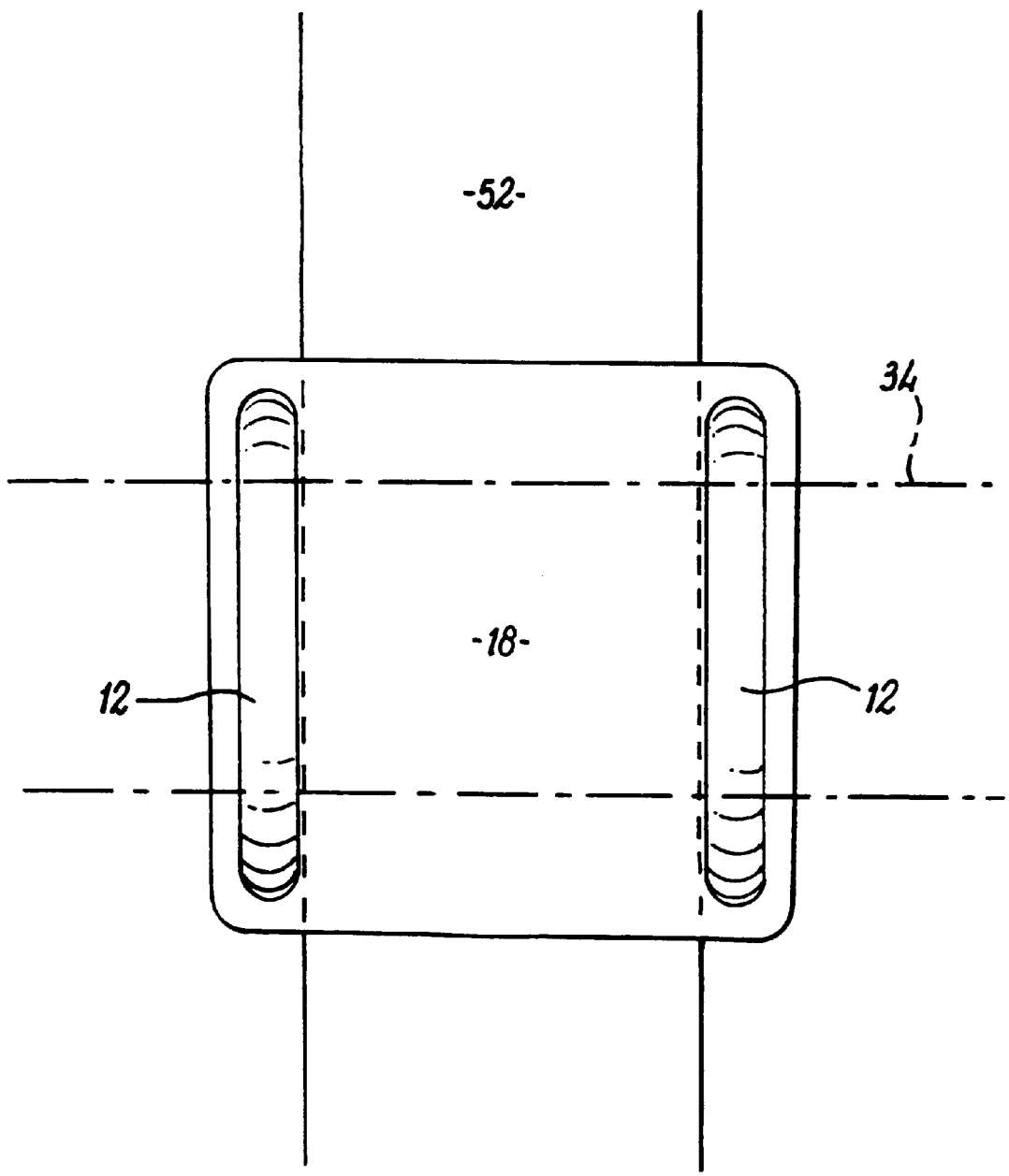
FIG. 7 is a view along the lines VII—VII in FIG. 6.

Referring to FIGS. 6 and 7, there is shown a second embodiment of the clamping arrangement 10 which is similar to the embodiments shown in FIGS. 1 to 5, and the same features have been given the same reference numerals.

In the embodiments shown in FIGS. 6 and 7, the engagement member 18 is fixedly mounted to an element in the form of a tube 52. In this embodiment, the tube 52 is of a square cross-section. The engagement member 18 is fixed to the tube 32 on the opposite side thereof to the plate 16.

The engagement member 18 is provided with raised regions 36 and recesses 38 which are the same as those shown in FIGS. 1 and 4.

The embodiment shown in FIGS. 6 and 7 further includes a bracing member 40 fixedly mounted on the tube 52 on the opposite side thereof to the engagement member 18. The engagement member 18 and the bracing member 40 are both of a substantially square configuration and define apertures through which the U-shaped members 12, 14 extend.

When the bolt 24 is screwed into the plate 16, the bolt 24 pushes against the bracing member 40 thereby moving the U-shaped members 12, 14, and the plate 16, in the direction indicated by the arrow B. A further tube 34 (shown in dotted lines) can be inserted through the U-shaped members 12, 14, as shown, and when the bolt 24 is screwed into the plate 16, the U-shaped members pull the tube 34 against the engagement member 18 thereby fastening the tube 34 to the tube 52.

It will be appreciated that in the embodiments shown in FIGS. 1 to 5, the fastener operates by the bolt 24 moving the engagement member 18 towards the first tube 32 in the direction of the arrow A. In the embodiments shown in FIGS. 6 and 7, on the other hand, the fastener operates by the bolt 24 engaging the bracing member 40 to push the plate 16 away from the bracing member 40 to pull the U-shaped members towards the second tube 34 in the direction of the arrow B. It will be appreciated that these two methods of operation are mechanically equivalent to each other.

In a modification, the engagement member 18 and the bracing member 40 can be in the form of apertured lugs (not shown) fixedly attached to the tube 32. In a further modification, the bracing member 40 can be omitted completely, in which case, the bolt 24 will engage directly onto the tube 32.

The clamping arrangement illustrated in FIG. 8 is intended for permanent attachment to the side of a square section elongate tube 110 to which a second elongate tube (not shown) is to be removably clamped.

The mounting arrangement comprises a rectangular reaction member or plate 112 and a rectangular engagement member or plate 114 attached by welding 116, 118 to a side of the square section tube 110 with the reaction plate 112 and the engagement plate 114 extending transversely therefrom.

Mounting means in the form of a pair of circular cross-section bars 120 are fixed to the engagement plate 114 and extend parallel to the longitudinal axis of the square section member 110 they support, at their top ends.

The portion 22 of the reaction plate 112 fixed to the upper ends of the bars 120 is inclined upwardly away from the mounting members 120 and the remaining section 124 is parallel to the engagement plate 114. This enables a threaded collar 126 fixed by welding to the inclined portion of the reaction plate 112 to have its axis inclined relative to the longitudinal axis of the square cross section tube 110 so that a clamping bolt 128, threadably mounted in the collar 126 and having a transverse operating handle 130 can be rotated without the handle 130 coming into contact with the square section member 110.

A movable member or plate 132 has two circular apertures (not shown) towards one of its ends by which it can be slidably mounted on the bars 116. It is spring biased towards the first plate 112 by a coil spring 134 mounted around one of the bars 120. It will be realised that on screwing down the clamping bolt 128 the movable plate 132 will move towards the engagement plate 114 so that the elongate tube to be clamped when placed between the engagement plate 114 and the movable plate 132, engages the engagement plate 114 and is sandwiched between the engagement plate 114 and the movable plate 132, downward movement of the clamping bolt 128 increasing a clamping action.

To increase the clamping action and to assist in the location of the elongate tube the movable plate 132 has two or more creases 36 formed therealong such that its underface corresponds to an extent to the outer profile of the elongate tube to be clamped.

The modified clamping arrangement shown in FIG. 9 is intended for mounting to the end of the square-section tube 110. Like the arrangements shown in FIG. 8, it includes a reaction plate 112, a base plate 112 fixed by welding to the end of the tubular member. The reaction plate 112 carries a clamping bolt 128 in a threaded collar 126 fixed to the reaction plate 112. The first plate 114 is mounted in spaced relationship to the engagement plate 114 by two mounting means each comprising a pair of circular cross-section bars 120, one bar of each pair being provided with a biasing coil spring 134. The movable plate 132 is provided with crease lines 136 to define a downwardly facing V or arc to accommodate the upper regions of the tubular member being clamped by the arrangement. The operation of the clamping arrangement in FIG. 9 is similar to that of FIG. 8.

Various modifications can be made without departing from the scope of the invention. For example, the u-shaped members 12, 14 could differ from the shapes shown in FIGS. 1 and 2 and be any suitable shape depending upon the profile of the tube to be clamped. Also the movable member could be guided by a single bar in the FIG. 8 embodiment or on a pair of spaced bars in the FIG. 9 embodiment. The bars need not be of circular cross-section but could be rectangular in cross-section. Means other than the clamping bolt 24 or 128 co-operating with the nut 28 or threaded collar 126 could be provided for moving and holding the movable member 18 or 132 against the member to be clamped.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A clamping arrangement comprising a reaction member, mounting means extending from the reaction member, a movable member mounted on and guided by the mounting mean, the mounting means being in the form of two U-shaped members each defining a central region and a pair of rods integral with the central region and extending therefrom in substantially the same direction as each other, said U-shared members being arranged in alignment for an article to be received between the rods of each U-shaped member the ends of the rods remote from the central region being permanently mounted to said reaction member, wherein said central region of the U-shaped member constitutes an engagement member to engage the article received between said rods, and the arrangement further including urging means operable via the reaction member to urge relatively the movable member and the engagement member towards each other, whereby on arranging the article to be clamped between said rods and between the moveable and engagement members, operation of the urging means causes the movable member to clamp the article between said moveable and engagement members.

2. A clamping arrangement according to claim 1 wherein the reaction member comprises a substantially flat plate which is of a substantially rectangular configuration.

3. A clamping arrangement according to claim 1 wherein the mounting means is attached to the reaction member by welding or other suitable means of attachment.

4. A clamping arrangement according to claim 1 wherein the reaction member and the mounting means are of integral construction formed together.

5. A clamping arrangement according to claim 1 wherein the reaction member defines an aperture through which the urging means extends.

6. A clamping arrangement according to claim 5 wherein the aperture is provided with threads and the urging means is provided with corresponding threads, whereby when the urging means is screwed into the reaction member aperture to engage the engagement member, the engagement member is urged away from the reaction member.

7. A clamping arrangement according to claim 1 wherein the urging means is in the form of a bolt threadably received in the engagement member.

8. A clamping arrangement according to claim 1 wherein the movable member comprises a contact surface which is appropriately configured to correspond to the configuration of the article.

9. A clamping arrangement according to claim 8 wherein the contact surface comprises raised regions and recesses between the raised regions to correspond to the configuration of the article, the raised regions being substantially planar to engage a substantially planar surface on the article, and the recesses having a curved configuration to correspond to a curved surface on the article.

10. A clamping arrangement according to claim 1 wherein the movable member is attached onto an element, the element being arranged between the movable member and the reaction member.

11. A clamping arrangement according to claim 10 wherein a bracing member is provided on the element between the element and the reaction member.

12. A clamping arrangement according to claim 11 wherein the bracing member is in the form of a plate which is attached, to the element, the bracing member defines apertures through which the receiving means extends.

13. A clamping arrangement according to claims 10 wherein the movable member is in the form of lugs, each lug defining an aperture, and the lugs being provided on and extending from the element, whereby the rods extend through the apertures in respective lugs.

14. A clamping arrangement according to claim 11 wherein the bracing member is in the form of lugs fixed to the element, each lug defining an aperture for said mounting means.

15. The use of a clamping arrangement as claimed in claim 1 comprising arranging a first article to be clamped between the rods of the U-shaped member, and between the movable and engagement members, arranging a second article to be clamped between said first article and said movable member, operating the urging means to cause the movable member to engage the second article, thereby urging the second article onto the first article, and the first article onto the engagement member to secure the first and second articles between the movable and engagement members.

16. The use according to claim 15 wherein the step of operating the urging means comprises screwing the urging means into the reaction member.

17. The use according to claim 15 wherein a first article is arranged between the rods of the or each U-shaped member and between the movable and engagement members and a second article is arranged between the first article and the movable member, wherein the first and second articles are clamped together between the engagement member and the movable member on operation of the urging means.

18. The use according to claim 15 wherein a first article is secured to the movable member, between the movable member and the reaction member, and a second article is arranged between the rods of the or each U-shaped member whereby on operation of the urging means the second article is clamped to the clamping arrangement between the movable and engagement members.

19. An assembly comprising a selected one of a pipe and a tube and a clamping arrangement, the clamping arrangement comprising reaction member, mounting means in the form of first and second spaced rods extending from said reaction member and supporting an engagement member spaced from said reaction member, the first and second rods being permanently attached at their opposite ends respectively to the reaction member and the engagement member, the arrangement further including a movable member provided by said mounting means between said reaction and enagement members, and urging means mounted on said reaction member to urge said movable member towards said engagement member, whereby on arranging an article between said engagment and movable members, operation of the urging means, causes movement of the movable member towards said engagement member to clamp the article therebetween, the arrangement being attached permanently to said selected one at least at said engagement member.

20. An assembly according to claim 19 wherein the reaction member is connected to the rods and the urging means comprises a clamping bolt threadably received in said reaction member, the clamping bolt being operable by screwing said bolt into said reaction member.

21. An assembly according to claim 19 wherein the engagement member is in the form of a plate.

22. An assembly according to claim 20 wherein the reaction member is inclined away from the engagement member over a portion extending from said mounting means and the clamping bolt is threadably mounted in said inclined portion.

23. An assembly according to claim 19 wherein the movable member is deformed out of a planar condition.

24. An assembly according to claim 23 wherein the deformations are provided by creases whereby the face of the movable member facing the reaction member defines at least a portion of a channel for reception of the elongate article to be clamped.

25. The use of an arrangement assembly as claimed in claim 1 comprising arranging the article between the reaction and the movable members, operating the urging means to cause movement of the movable member into engagement with the article to clamp the article between said movable and engagement members.

26. The use according to claim 25, wherein the step of operating the urging means comprises screwing the urging means into the reaction members.

27. An assembly comprising a selected one of a pipe and a clamping arrangement, the clamping arrangement comprising reaction member, mounting means in the form of first and second spaced rods extending from said reaction member and supporting an engagement member spaced from said reaction member, the first and second rods being permanently attached at their opposite ends respectively to the reaction member and the engagement member, the arrangement further including a movable member provided by said mounting means between said reaction and engagement members, and urging means mounted on said reaction member to urge said movable member towards said reaction member, whereby on arranging an article between said reaction and movable members, operation of the urging means, causes movement of the movable member towards said engagement member to clamp the article therebetween, the arrangement being attached permanently to said selected one of the pipe and the tube at least at said engagement member, and said movable member being spring biased away from said engagement member.

28. An assembly comprising a selected one of a pipe, and a tube and a clamping arrangement, the clamping arrangement comprising reaction member, two spaced mounting means in the form of first and second spaced rods extending from said reaction member and supporting an engagement member spaced from said reaction member, the first and second rods being permanently attached at their opposite ends respectively to the reaction member and the engagement member, the arrangement further including a movable member provided by said mounting means between said reaction and enagement members, and urging means mounted on said reaction member to urge said movable member towards said reaction member, whereby on arranging an article between said reaction and movable members, operation of the urging means, causes movement of the movable member towards said engagement member to clamp the article therebetween, the arrangement being attached permanently to said selected one at least at said engagement member, and the engagement member being fixed to the end of a structure and the movable member being guided on both mounting means, and one rod of each mounting having a coil spring arranged therearound the bias to movable member away from the engagement member.

29. An assembly according to claim 27 wherein the spring biasing is provided by a coil spring fitted around one of bars.

\* \* \* \* \*